United States Patent

[11] 3,633,616

| | | | |
|---|---|---|---|
| [72] | Inventor | Harry M. Meshek<br>Bartlesville, Okla. | |
| [21] | Appl. No. | 68,814 | |
| [22] | Filed | Sept. 2, 1970 | |
| [45] | Patented | Jan. 11, 1972 | |
| [73] | Assignee | Phillips Petroleum Company | |

[54] STREAM SWITCHING AND INDICATING APPARATUS
6 Claims, 3 Drawing Figs.

[52] U.S. Cl. ............................................ 137/554,
73/23.1, 307/223
[51] Int. Cl. .................................................. F16k 37/00,
G01n 31/08, H03k 23/08

[50] Field of Search............................................ 73/23.1;
307/223; 137/554

[56] References Cited
UNITED STATES PATENTS

| | | | |
|---|---|---|---|
| 3,068,685 | 12/1962 | Rogers........................ | 73/23.1 |
| 3,432,684 | 3/1969 | Michael et al............... | 307/223 |

*Primary Examiner*—Henry T. Klinksiek
*Attorney*—Young and Quigg

ABSTRACT: Apparatus comprising two flip-flop circuits is employed to control selectively the passage of two fluid streams to an analyzer. Signals are also established to indicate the particular stream being passed to the analyzer.

PATENTED JAN 11 1972 3,633,616

INVENTOR.
H. M. MESHEK

BY Young & Quigg

ATTORNEYS

STREAM SWITCHING AND INDICATING APPARATUS

Chromatographic analyzers and other types of analytical instruments are employed extensively in the chemical and petroleum industries to analyze fluid streams automatically. It is often desirable to employ a single analyzer to analyze two streams alternately and repetitively. In such an operation there is a need for apparatus which is capable of automatically switching sample streams to the inlet of the analyzer and providing a positive indication of the particular stream being analyzed at any given time.

In accordance with this invention, apparatus is provided which is capable of meeting the foregoing requirements. The stream switching is accomplished by electrically operated valves which are energized by output signals from a first flip-flop circuit. A second flip-flop circuit is provided to apply an identification signal to the recorder to provide a positive indication of the particular stream being directed to the analyzer at any given time. The circuit employed to energize the valves can be actuated by output signals from a programmer employed in combination with the analyzer.

Figure 1:
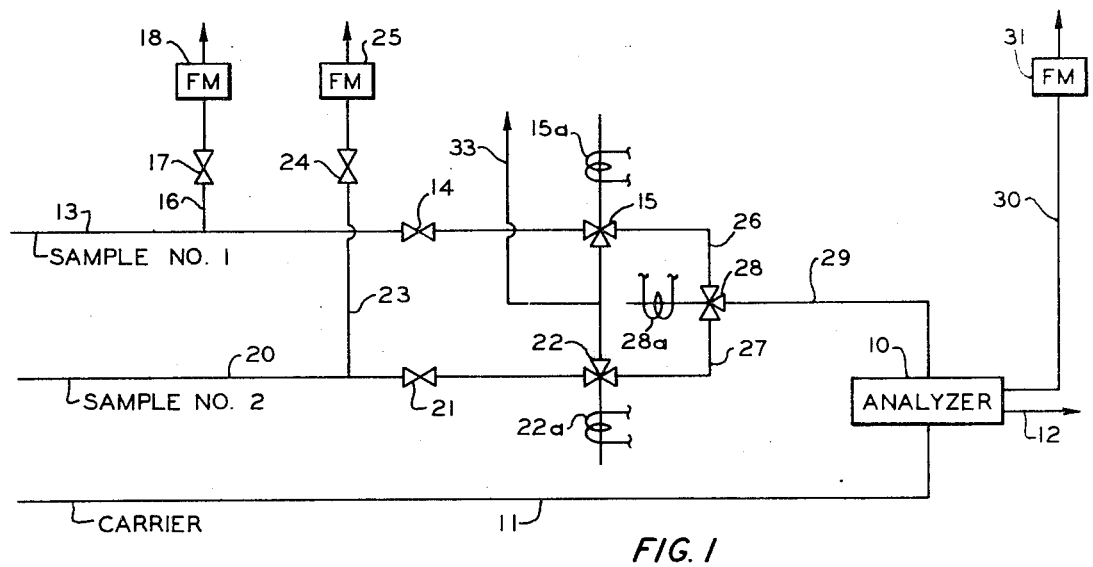
FIG. 1 is a schematic representation of apparatus employed to direct two samples selectively to the inlet of an analyzer.

Referring now to the drawing in detail and to FIG. 1 in particular, there is shown in analyzer 10, which in the specific embodiment of this invention to be described in a chromatographic analyzer. A carrier fluid is introduced into the analyzer through a conduit 11, and is vented through a conduit 12. A first sample stream to be analyzed is introduced through a conduit 13 which has a valve 14 therein. Conduit 13 communicates with a first three-way valve 15. A vent conduit 16 communicates with conduit 13 upstream of valve 14. A valve 17 and a flow meter 18 are disposed in conduit 16. A second sample stream to be analyzed is introduced through a conduit 20 which has a valve 21 therein. Conduit 20 communicates with a second three-way valve 22. A vent conduit 23 communicates with conduit 20 upstream of valve 21. A valve 24 and a flow meter 25 are disposed in conduit 23.

A conduit 26 extends from valve 15 to a third three-way valve 28. A conduit 27 extends between valves 22 and 28. Valve 28 is connected to the inlet of analyzer 10 by a conduit 29. A vent conduit 30, which has a flow meter 31 therein, communicates with analyzer 10 to vent sample. A vent conduit 33 is connected to valves 15 and 22.

Valves 15, 22 and 28 are actuated by respective solenoids 15a, 22a and 28a. When these three solenoids are energized, conduit 26 is in communication with conduit 33, conduit 20 is in communication with conduit 27, and conduit 27 is in communication with conduit 29. When the three solenoids are deenergized, conduit 13 is in communication with conduit 26, conduit 27 is in communication with conduit 33, and conduit 26 is in communication with conduit 29. Valves 14 and 17 permit the relative flows through conduits 13 and 16 to be regulated so that Sample No. 1 can be introduced into the analyzer from conduit 13 at a predetermined rate. Similarly, valves 21 and 24 permit the flow rate of Sample No. 2 to be adjusted. The flow meters provide visual indications of the flows through the respective conduits to permit the desired adjustments to be made.

Figure 2:
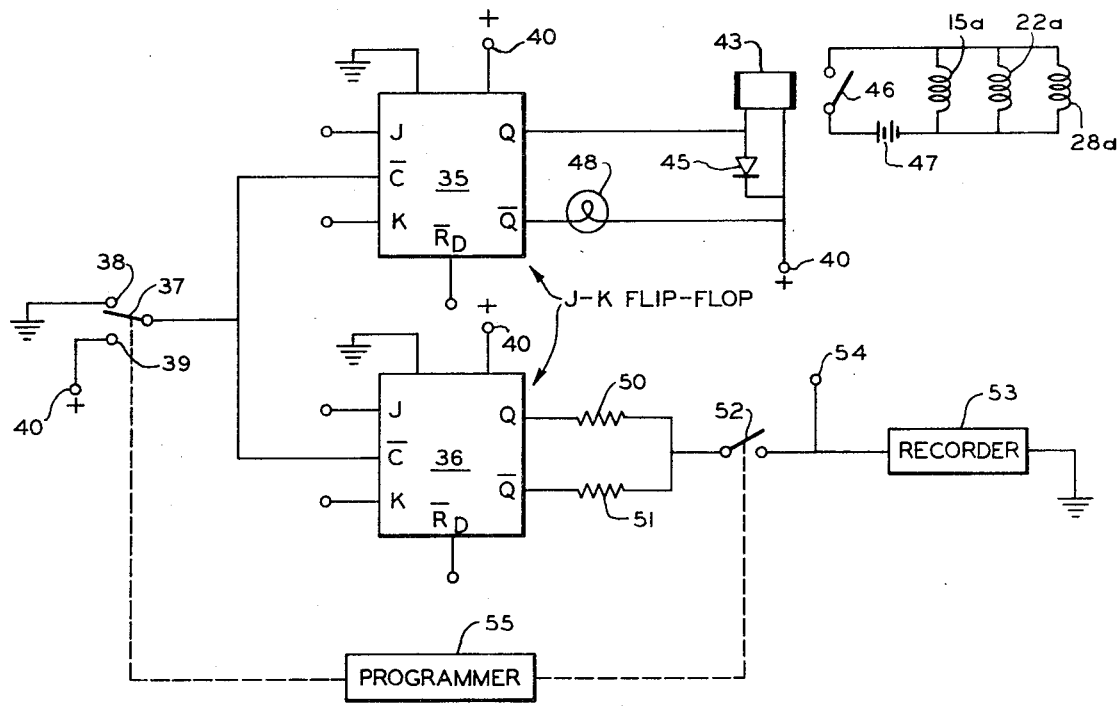
FIG. 2 is a schematic circuit drawing of apparatus employed to control the operation of the stream-switching valves of FIG. 1.

Solenoids 15a, 22a and 28a are controlled by the circuit illustrated in FIG. 2. This circuit comprises two flip-flop circuits 35 and 36, such as a dual J-K flip-flop. An integrated circuit of this type is described in "The Integrated Circuit Data Book," Motorola, Inc., P. O. Box 20912, Phoenix, Ariz. 85036, page 3-22 (1968) The $\overline{C}$ terminals of flip-flops 35 and 36 are connected to switch 37 which selectively engages terminals 38 and 39. Terminal 38 is connected to ground, and terminal 39 is connected to a terminal 40 which is maintained at a positive potential, such as 15 volts. The Q output terminal of flip-flop 35 is connected to the first terminal of a relay coil 43, the second terminal of which is connected to positive potential terminal 40. A rectifier 45 is connected across relay coil 43. When relay coil 43 is energized, a switch 46 is closed to connect solenoids 15a, 22a and 28a in circuit with a current source 47. An indicator lamp 48 is connected between the $\overline{Q}$ terminal of flip-flop 35 and terminal 40.

The illustrated J-K flip-flops are of such configuration that the flip-flops latch in a first position when switch 37 engages ground terminal 38. When the flip-flop is operated from a power source 40 of 15 volts, output terminal Q is at a potential of 15 volts when the flip-flop is latched in this first position. Terminal $\overline{Q}$ is at ground potential in this position. When the illustrated J-K flip-flops are used, no connections are made to the J, K, or $\overline{R}_D$ terminals. In the first position described above, there is no current flow through relay coil 43 because terminals Q and 40 are at the same potential. Switch 46 remains open at this time so that the solenoids 15a, 22a and 28a are deenergized. This results in Stream No. 1 flowing to the analyzer from conduit 13 through valve 15, conduit 26, valve 28 and conduit 29. If any leakage should occur through valve 28 at this time, such leakage is vented through valve 22 and conduit 33. Where potential leakage is not a problem, valves 15 and 22 and conduit 33 can be eliminated. Since terminal $\overline{Q}$ is at ground potential in the first flip-flop position, current flows through indicating lamp 48 to provide a visual indication that Stream No. 1 is flowing to the analyzer. When it is desired to direct Sample No. 2 to the analyzer, switch 37 is moved into engagement with terminal 39 for a short period of time and is then returned to engage terminal 38, thereby applying a positive pulse to the flip-flop input. This pulse causes flip-flop 35 to latch in a second position such that terminal Q is at ground potential and terminal $\overline{Q}$ is at 15-volt potential. Current thus flows through relay coil 43 to close switch 46. This energizes the three solenoids so that Sample No. 2 flows into analyzer 10. Since terminals $\overline{Q}$ and 44 are at the same potential, there is no current flow through indicating lamp 48. This provides a visual indication that Stream No. 2 is being passed to the analyzer.

Figure 3:
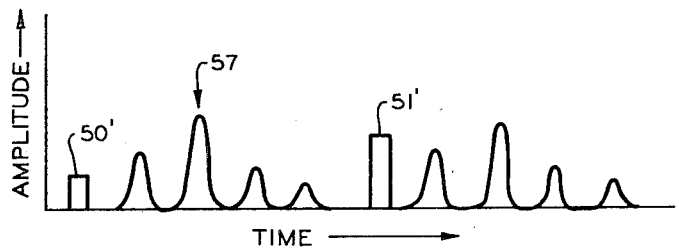
FIG. 3 illustrates a typical signal applied to the recorder of FIG. 2.

Flip-flop 36 serves to apply signals to a recorder 53 to establish a permanent record of the particular stream being analyzed. Resistors 50 and 51 connect terminals Q and $\overline{Q}$, respectively, of flip-flop 36 to a switch 52. Closure of this switch results in the two resistors being connected to the input of recorder 53. An input terminal 54 is also connected to the recorder. The signal applied to terminal 54 is the normal output signal of analyzer 10. For example, if temperature-sensitive resistance elements are employed in a bridge circuit to compare compositions of the column effluent and a carrier gas stream, an electrical output signal is established which is representative of the individual constituents as they appear in the column effluent. This is the normal input signal to the recorder and results in a chromatogram such as shown at 57 in FIG. 3. Resistors 50 and 51 are sized so that different potentials appear at switch 52, depending on the position of flip-flop 36. For example, resistor 50 can have a value of approximately 150,000 ohms, and resistor 51 can have a value of approximately 75,000 ohms. When the flip-flop is in the first position, terminal Q is at a potential of 15 volts and switch 52 is at a potential of approximately 1 millivolt. Switch 52 is closed momentarily at the beginning of the analysis cycle so that this 1-millivolt signal is applied to recorder 53. This is illustrated by bar 50' in FIG. 3. Sample No. 1 is passed to the analyzer and a conventional chromatogram 57 is obtained. When Sample No. 2 is introduced into the analyzer, switch 52 is again closed momentarily. At this time, terminal Q is at 15 volts and switch 52 is at approximately 2 millivolts. This provides a bar 51' on the recorder of greater height than bar 50'. The two bars of different heights thus serve to identify the particular sample stream being analyzed.

Switches 37 and 52 can be operated automatically by a programmer 55 which is associated with analyzer 10. This programmer normally serves additional functions such s actuating a sample valve in the analyzer and controlling attenuation potentiometers in the analyzer output circuit. Programmers to accomplish these results are well known.

From the foregoing description, it can be seen that a simple and reliable device has been provided in accordance with this invention which is capable of selectively controlling the introduction of samples into an analyzer and providing a positive indication of the particular sample being analyzed. While the invention has been described in conjunction with a presently preferred embodiment, it should be evident that it is not limited thereto.

What is claimed is:

1. Apparatus for selectively passing first and second fluid streams to a common point of usage comprising:
   a three-way solenoid-operated valve having first, second and third ports, said first and second ports being connected when said solenoid is deenergized, and said first and third ports being connected when said solenoid is energized;
   first conduit means communicating with said second port to introduce a first fluid;
   second conduit means communicating with said third port to introduce a second fluid, said first port being adapted to be connected to the common point of usage;
   a current source;
   circuit means including switching means connecting the solenoid of said valve to said current source;
   a flip-flop circuit having an input and first and second outputs, said first output normally being maintained at a potential greater than the potential at said second output, the application of a series of pulses to said input serving to reverse the potentials at said outputs in sequence;
   means for applying pulses to the input of said flip-flop circuit; and
   means responsive to the potentials at said outputs to control said switching means so that said solenoid is alternately energized and deenergized by the application of a series of pulses to the input of said flip-flop.

2. The apparatus of claim 1 wherein said flip-flop circuit is a J-K flip-flop.

3. The apparatus of claim 1 wherein said switching means comprises a relay to connect said current source to said solenoid, means connecting one terminal of the coil of said relay to one output of said flip-flop circuit, and means connecting the second terminal of the coil of said relay to a point of reference potential, said point of reference potential being substantially equal to the potential at said first output when said flip-flop circuit is in a first position.

4. The apparatus of claim 1, further comprising an indicating lamp connected to one output of said flip-flop circuit so as to be energized alternately when a series of pulses is applied to the input of said flip-flop circuit.

5. The apparatus of claim 1, further comprising a second flip-flop circuit having an input and first and second outputs, the first output of said second flip-flop circuit normally being maintained at a potential greater than the potential at the second output of said second flip-flop circuit, the application of a series of pulses to the input of said second flip-flop circuit serving to reverse the potentials at the two outputs of said second flip-flop circuit; means connecting the input of said second flip-flop circuit to the input of said first-mentioned flip-flop circuit; and means connected to the first and second outputs of said second flip-flop circuit to establish first and second indicating signals.

6. The apparatus of claim 5 wherein said means to establish said indicating signals comprises first and second resistors having first terminals thereof connected to the respective outputs of said second flip-flop circuit, said resistors having different values; and means for connecting the second end terminals of said resistors selectively to a recording means to apply different potentials to the recording means depending on the position of the second flip-flop circuit.

* * * * *